(12) United States Patent
Lee

(10) Patent No.: US 9,326,057 B2
(45) Date of Patent: Apr. 26, 2016

(54) MICROPHONE MODULE FOR ELECTRONIC DEVICE

(71) Applicant: Samsung Electronics Co. Ltd., Suwon-si, Gyeonggi-do (KR)

(72) Inventor: Jun-Tae Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/052,111

(22) Filed: Oct. 11, 2013

(65) Prior Publication Data

US 2014/0112518 A1    Apr. 24, 2014

(30) Foreign Application Priority Data

Oct. 22, 2012  (KR) ........................ 10-2012-0117327

(51) Int. Cl.
| | |
|---|---|
| *H04R 1/04* | (2006.01) |
| *H04R 1/08* | (2006.01) |
| *H04M 1/03* | (2006.01) |
| *H04R 1/28* | (2006.01) |

(52) U.S. Cl.
CPC ................ *H04R 1/04* (2013.01); *H04M 1/035* (2013.01); *H04R 1/08* (2013.01); *H04R 1/2853* (2013.01); *H04R 2499/11* (2013.01); *H04R 2499/15* (2013.01)

(58) Field of Classification Search
CPC ............ H04R 1/00; H04R 1/02; H04R 1/021; H04R 1/023; H04R 1/025; H04R 1/04; H04R 1/20; H04R 1/28; H04R 1/2892; H04R 1/30; H04R 1/34; H04R 1/342; H04R 1/026; H04R 2201/02; H04R 2201/029; H04R 2201/10; H04R 2400/01; H04R 2400/03; H04R 2499/11; H04R 2499/15; H04R 1/2884; H04R 1/2888; H04R 1/32; H04R 1/323; H04R 1/326; H04R 1/345; H04R 2400/11
USPC ............ 381/87, 332, 333, 91, 338, 339, 345, 381/161, 355, 360, 361, 365, 368, 387, 388, 381/392
See application file for complete search history.

(56) References Cited

U.S. PATENT DOCUMENTS

| | | | |
|---|---|---|---|
| 5,539,834 A | 7/1996 | Bartlett et al. | |
| 6,427,017 B1 * | 7/2002 | Toki | 381/190 |
| 7,583,811 B2 * | 9/2009 | Wada | 381/388 |
| 7,991,148 B2 * | 8/2011 | Holmes et al. | 379/433.02 |
| 8,488,817 B2 * | 7/2013 | Mittleman et al. | 381/189 |
| 8,548,189 B2 * | 10/2013 | Xiao | 381/386 |
| 8,724,840 B2 * | 5/2014 | Doller et al. | 381/359 |

(Continued)

FOREIGN PATENT DOCUMENTS

| | | |
|---|---|---|
| EP | 1 865 690 A1 | 12/2007 |
| KR | 10-2008-0046521 A | 5/2008 |

(Continued)

*Primary Examiner* — Ahmad F Matar
*Assistant Examiner* — Sabrina Diaz
(74) *Attorney, Agent, or Firm* — Jefferson IP Law, LLP

(57) ABSTRACT

A microphone module for an electronic device is provided. The microphone module includes a window having at least one microphone hole in a part of an edge of the window, a microphone installed in a position corresponding to the microphone hole of the window, and a case frame coupled with the window and forming an appearance of the electronic device. The microphone module receives an external voice through the microphone hole of the window.

17 Claims, 6 Drawing Sheets

(56) References Cited

U.S. PATENT DOCUMENTS

| | | |
|---|---|---|
| 2005/0014537 A1 | 1/2005 | Gammon et al. |
| 2006/0078138 A1* | 4/2006 | Wada ............................ 381/306 |
| 2006/0293091 A1 | 12/2006 | Hawker et al. |
| 2010/0128914 A1 | 5/2010 | Khenkin |
| 2011/0156176 A1 | 6/2011 | Huckabee et al. |
| 2012/0051570 A1* | 3/2012 | Arche ............................ 381/315 |
| 2012/0177229 A1 | 7/2012 | Lorenz et al. |
| 2013/0051595 A1* | 2/2013 | Yang et al. .................... 381/332 |
| 2013/0114844 A1 | 5/2013 | Fukazawa et al. |
| 2013/0251183 A1 | 9/2013 | Doller et al. |
| 2015/0326699 A1 | 11/2015 | Chang et al. |

FOREIGN PATENT DOCUMENTS

| | | |
|---|---|---|
| KR | 10-2011-0125297 A | 11/2011 |
| KR | 10-2012-0120567 A | 11/2012 |

* cited by examiner

MICROPHONE MODULE FOR ELECTRONIC DEVICE

CROSS-REFERENCE TO RELATED APPLICATION(S)

This application claims the benefit under 35 U.S.C. §119 (a) of a Korean patent application filed on Oct. 22, 2012 in the Korean Intellectual Property Office and assigned Serial No. 10-2012-0117327, the entire disclosure of which is hereby incorporated by reference.

TECHNICAL FIELD

The present disclosure relates to a microphone module for an electronic device and the electronic device thereof. More particularly, the present disclosure relates to a microphone module for an electronic device, formed to have a structure capable of preventing performance deterioration.

BACKGROUND

Owing to the development of the electronic communication industry, an electronic device, such as a mobile communication terminal (e.g., a smart phone), an electronic scheduler, a personal complex terminal, a Television (TV), a laptop computer, and the like, is becoming a necessity to modern society while becoming a significant means for delivery of rapidly changing information. Commonly, this electronic device came to make a user's work convenient through a Graphical User Interface (GUI) environment using a touch screen, and provide various multimedia based on a Web environment.

The aforementioned electronic device is developing to perform various supplementary functions while using a voice recognition function capable of performing a preset operation by recognizing a user's voice even when a user does not directly input a specific command to the electronic device through a separate key input (i.e., a touch input, a button input, or the like) as one way of data input, and is racing to increase a voice recognition rate.

Generally, the electronic device came to have a microphone module equipped with at least one microphone unit for collecting a user's voice for the sake of voice recognition. Besides the voice recognition function, this microphone module is being used even as an apparatus capable of housing a user's voice when a user talks with a called party by a speaker phone function.

For example, the microphone module applied to the electronic device, such as a mobile terminal, has one microphone unit installed in the front of the electronic device and the other one microphone unit in the rear of the electronic device. The microphone unit installed in the front can be used as a main microphone unit for directly receiving a user's voice, and the microphone unit installed in the rear can be used as a sub microphone unit for attenuating surrounding noises other than an input voice.

In general, the microphone module is able to receive an external voice or sound through a voice collection hole (also known as a "microphone hole") of a constant shape that is provided in a case frame of the electronic device. Accordingly, the microphone module has been installed in various positions of the case frame so as to effectively collect the external voice and/or sound.

However, this construction in which a plurality of microphone holes are provided in the case frame of the electronic device causes a problem of not only damaging an appearance of the electronic device but also deteriorating the performance of the electronic device at the time of using a multiple microphone module.

Therefore, a need exists for a microphone module for an electronic device having an improved appearance and preventing performance deterioration.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide a microphone module for an electronic device, realized to make an appearance of a product beautiful by not providing a separate microphone hole.

Another aspect of the present disclosure is to provide a microphone module for an electronic device, formed to have a structure capable of, by not visually exposing a microphone hole, making an appearance of a product beautiful and concurrently preventing performance deterioration.

Another aspect of the present disclosure is to provide a microphone module for an electronic device, realized to facilitate sound incidence and emission, such as voice recognition, sound emission, and the like, and to secure the reliability of a product.

The above aspects are achieved by providing a microphone module for an electronic device.

In accordance with an aspect of the present disclosure, a microphone module for an electronic device is provided. The microphone module includes a window having at least one microphone hole in a part of an edge of the window, a microphone installed in a position corresponding to the microphone hole of the window, and a case frame coupled with the window and forming an appearance of the electronic device. The microphone module receives an external voice through the microphone hole of the window.

In accordance with another aspect of the present disclosure, an electronic device is provided. The electronic device includes a window having at least one microphone hole in a part of an edge of the window, a microphone installed in a position corresponding to the microphone hole of the window, and a case frame coupled with the window and forming an appearance of the electronic device. The electronic device receives an external voice through the microphone hole of the window.

In accordance with another aspect of the present disclosure, an electronic device is provided. The electronic device includes a window having at least one speaker hole in a part of an edge of the window, a speaker installed in a position corresponding to the speaker hole of the window, and a case frame coupled with the window and forming an appearance of the electronic device. The electronic device emits sound through the speaker hole of the window.

Commonly, in the aforementioned aspects, a bracket is further interposed between the window and the microphone or the speaker. The bracket includes a first surface for installing the microphone or the speaker, a second surface facing the first surface and getting in surface contact with an inner surface of the window, a through-hole passing from a position in which the microphone or the speaker of the first surface is installed, to the second surface, and a wave guide groove provided to communicate from the through-hole to the microphone hole.

Further, a slit of a constant depth and a constant length can be provided in a position corresponding to the wave guide groove in the inner surface of the window. The slit may be provided by a double coated tape attached to the inner surface of the window or, when the window is formed, the slit may be molded together.

In addition, the microphone or the speaker is mounted and fixed to a fixing housing installed in an installation groove provided in the first surface of the bracket, and a separate sealing member is further attached to a top of the fixing housing. The sealing member includes a plate type body installed to protect the microphone or the speaker installed in the fixing housing, a bending end extending and bent at one side of the plate type body, and a sealing part formed at an end of the bending end and, when the window and the case frame are coupled with each other, disconnecting from the external a portion at which the microphone hole, the wave guide groove, and the slit meet.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device can be a portable electronic device, and can be a device, such as a portable terminal, a mobile phone, a mobile pad, a media player, a tablet computer, a handheld computer, a Personal Digital Assistant (PDA), or the like. In addition, the electronic device may be any portable electronic device including a device combining two or more functions among these devices. For example, the electronic device 1 includes a microphone module for housing an external voice and a speaker so as to perform a voice recognition function and a speaker phone function, and the microphone module and the speaker are applicable to various electronic devices that have display units in the front of the electronic devices.

Figure 1:
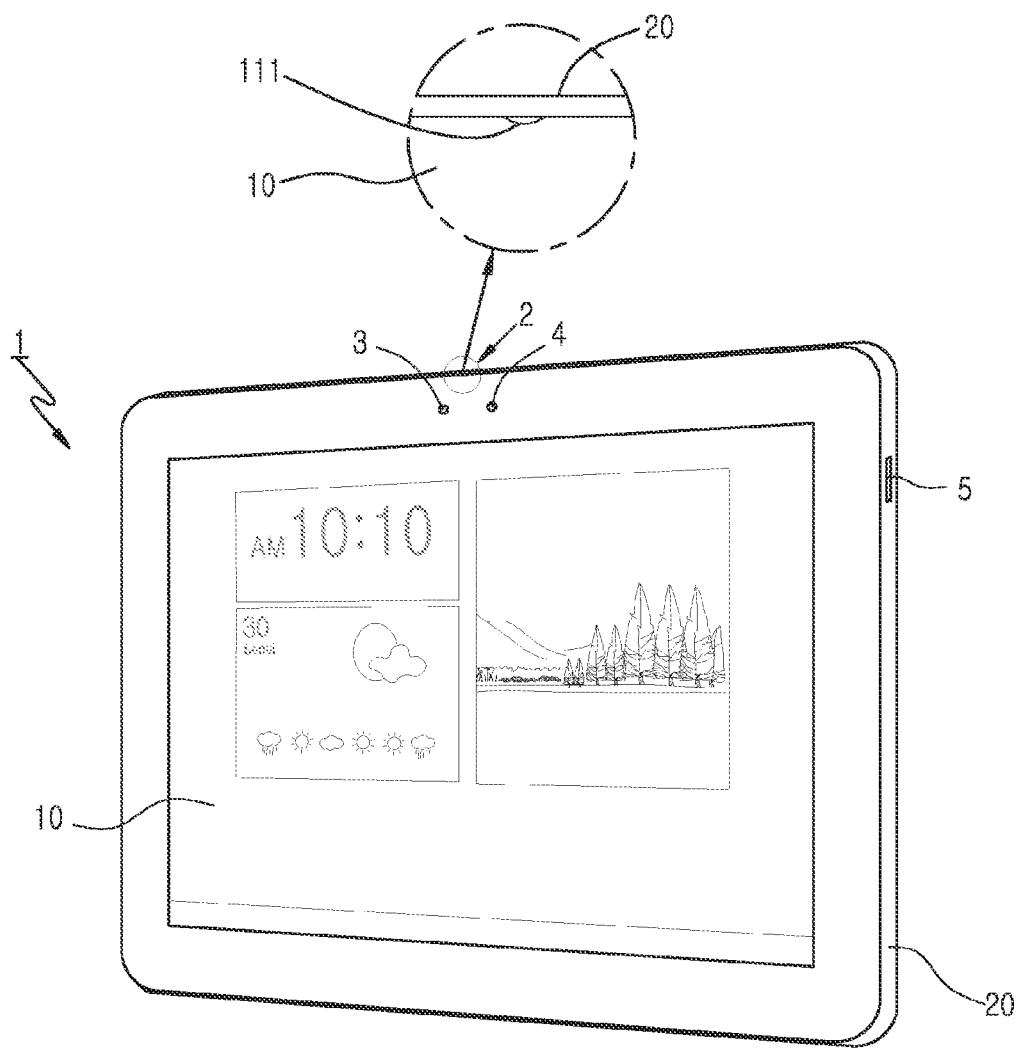
FIG. 1 is a perspective view illustrating an electronic device in which a microphone hole is provided in a window according to an embodiment of the present disclosure.

FIG. 1 is a perspective view illustrating an electronic device in which a microphone hole is provided in a window according to an embodiment of the present disclosure.

Referring to FIG. 1, a microphone hole 111 of a microphone module 2 is disposed between a window 10 of an electronic device 1 and a case frame 20 thereof. More specifically, the microphone hole 111 has a groove provided in a part of an edge of the window 10 to use the groove as an incident hole for introducing an external voice.

This microphone hole 111 is more advantageous when the window 10 of the electronic device 1 is disposed as a display unit in the front of the electronic device 1 and is coupled with the case frame 20. However, this does not limit the scope and spirit of the disclosure, and the microphone hole 111 is applicable to various windows, such as a camera window coupled with the case frame 20, a Light Emitting Diode (LED) window, and the like.

Reference numeral 5 denotes a speaker. When a multimedia object, e.g., a video file, a music file, and the like, are executed in the electronic device 1, the speaker 5 can emit music, voice, sound and the like. As illustrated in FIG. 1, the speaker 5 is installed at a lateral surface of the electronic device 1, but it does not matter that the speaker 5 is installed in the front 10 or rear 20 of the electronic device 1 in consideration of a design of the electronic device 1.

In addition, non-described reference numerals 3 and 4 can be a camera module and an illumination sensor, respectively.

Figure 2:
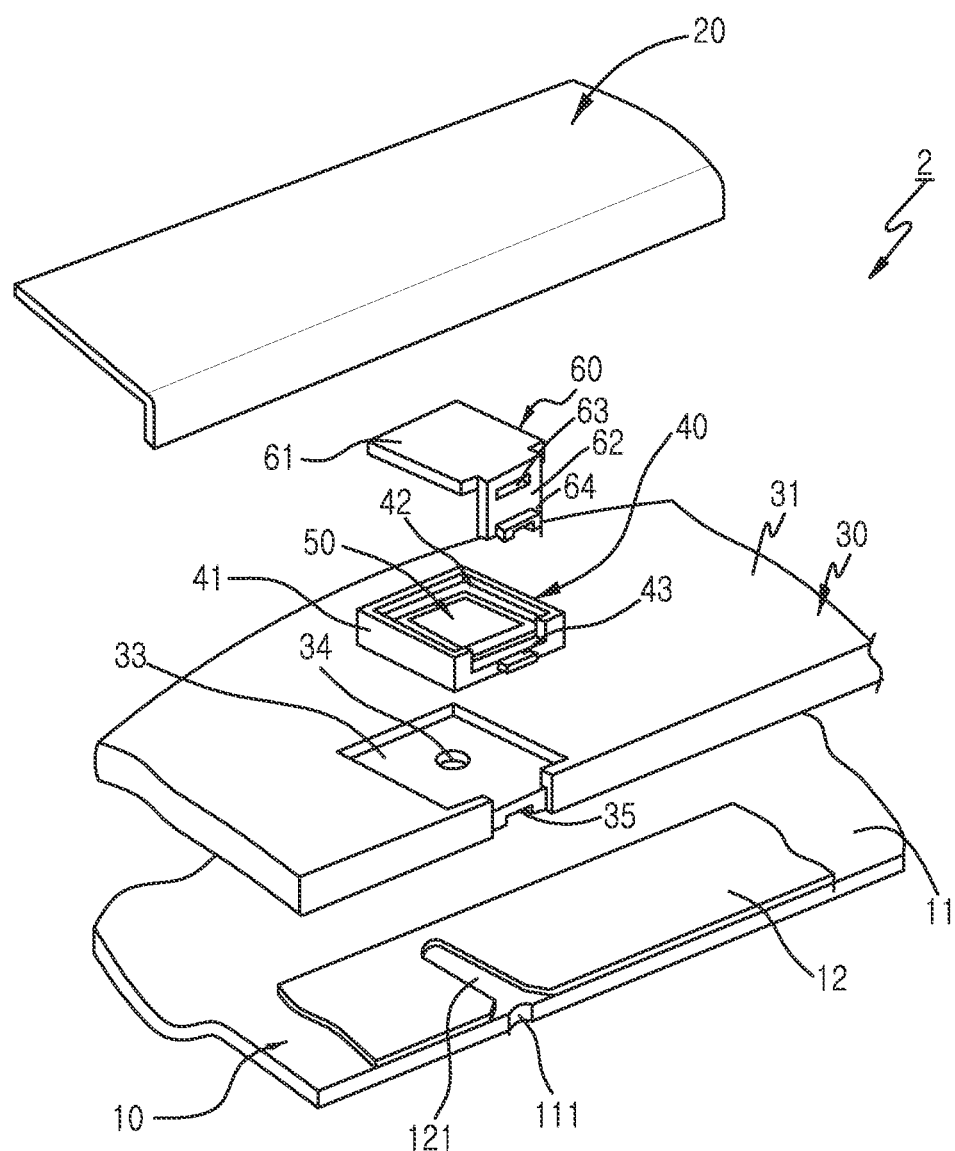
FIG. 2 is an explosive perspective view illustrating a microphone module installed in an electronic device according to an embodiment of the present disclosure.

FIG. 2 is an explosive perspective view illustrating a microphone module installed in an electronic device according to an embodiment of the present disclosure.

Figure 3:
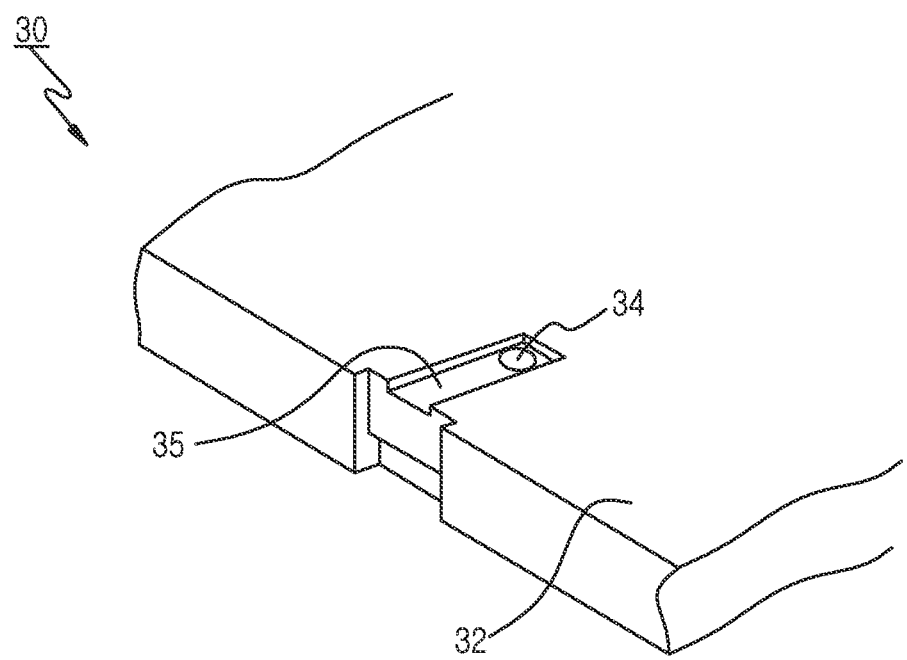
FIG. 3 is a rear partial perspective view illustrating a bracket of a microphone module according to an embodiment of the present disclosure.

FIG. 3 is a rear partial perspective view illustrating a bracket of a microphone module according to an embodiment of the present disclosure.

Referring to FIGS. 2 and 3, the microphone module 2 includes the window 10 including the microphone hole 111, the case frame 20 coupled to the window 10 and having a constant internal space, a bracket 30 coupled with the window 10 within the case frame 20, and a microphone 50 fixed to the bracket 30.

The window 10 has a double coated tape 12 that is attached along an edge of an inner surface 11 of the window 10. The double coated tape 12 firmly fixes the bracket 30 disposed at a top of the double coated tape 12, to the inner surface 11 of the window 10. In addition, the microphone hole 111 is provided at a suitable place of the edge of the window 10. The microphone hole 111 can be provided as a groove having a constant curvature. The double coated tape 12 can have a slit 121 of a constant length that is provided in a position corresponding to the microphone hole 111 to guide an incident voice. However, this does not limit the scope and spirit of the disclosure and, instead of the groove of the curved shape, grooves of various shapes can be provided.

Various kinds of electronic function groups of the electronic device 1 are mounted on the bracket 30. For example, the electronic function groups can be a touch panel, a Liquid Crystal Display (LCD) module, the microphone 50, and the like. An installation groove 33 is provided in a first surface 31 of the bracket 30 such that a fixing housing 40 for mounting the microphone 50 to be described below is installed in the installation groove 33. A through-hole 34 is provided in the installation groove 33 such that the through-hole 34 passes through up to a second surface 32 facing the first surface 31 of the bracket 30. The through-hole 34 is provided in a position corresponding to an installation position of the microphone 50 that is installed on the through-hole 34.

FIG. 3 illustrates a wave guide groove 35 provided to extend from the center of the through-hole 34 provided to pass up to the second surface 32 of the bracket 30, to an edge of the bracket 30. Accordingly, if the bracket 30 and the window 10 get in surface contact by the double coated tape 12, the slit 121 of the double coated tape 12 provided in the window 10 and the wave guide groove 35 provided in the second surface 32 of the bracket 30 are disposed to correspond to each other, and perform a role of a path for forwarding a voice that is introduced through the microphone hole 111 of the window 10.

On the other hand, the fixing housing 40 for mounting the microphone 50 is mounted in the installation groove 33 of the bracket 30. Though not illustrated, the fixing housing 40 may be fixed to the bracket 30 by means of a screw and the like.

A sealing member 60 is further mounted on the fixing housing 40. The sealing member 60 includes a plate type body 61, a bending end 62, and a sealing part 64. The plate type body 61 of the sealing member 60 is fitted into a member housing groove 42 of the fixing housing 40 after the microphone 50 is housed in the fixing housing 40. The member housing groove 42 of the fixing housing 40 is provided above the microphone 50 housed in the fixing housing 40. The bending end 62 of the sealing member 60 is formed to extend from the plate type body 61 and bend toward the bracket 30. The sealing part 64 of the sealing member 60 is formed at an end of the bending end 62. The sealing part 64 of the sealing member 60 performs a sealing role of, after the sealing member 60 is installed in the fixing housing 40, connecting the microphone hole 111 of the window 10 with the wave guide groove 35 of the bracket 30 and disconnecting from the external, thereby being capable of efficiently housing an external voice to the microphone 50.

In addition, the bending end 62 of the sealing member 60 has a fixing groove 63, and the fixing housing 40 has a protrusion 43 protruding from an outer lateral surface 41 of the fixing housing 40. The plate type body 61 of the sealing member 60 is safely mounted in the member housing groove 42 of the fixing housing 40 and the protrusion 43 of the fixing housing 40 is insertion fixed into the fixing groove 63 of the bending end 62 of the sealing member 60. By doing so, the sealing member 60 can be prevented from being arbitrarily released from the fixing housing 40 after being mounted in the fixing housing 40.

The sealing member 60 can use any one of rubber and silicon materials.

Figure 4:
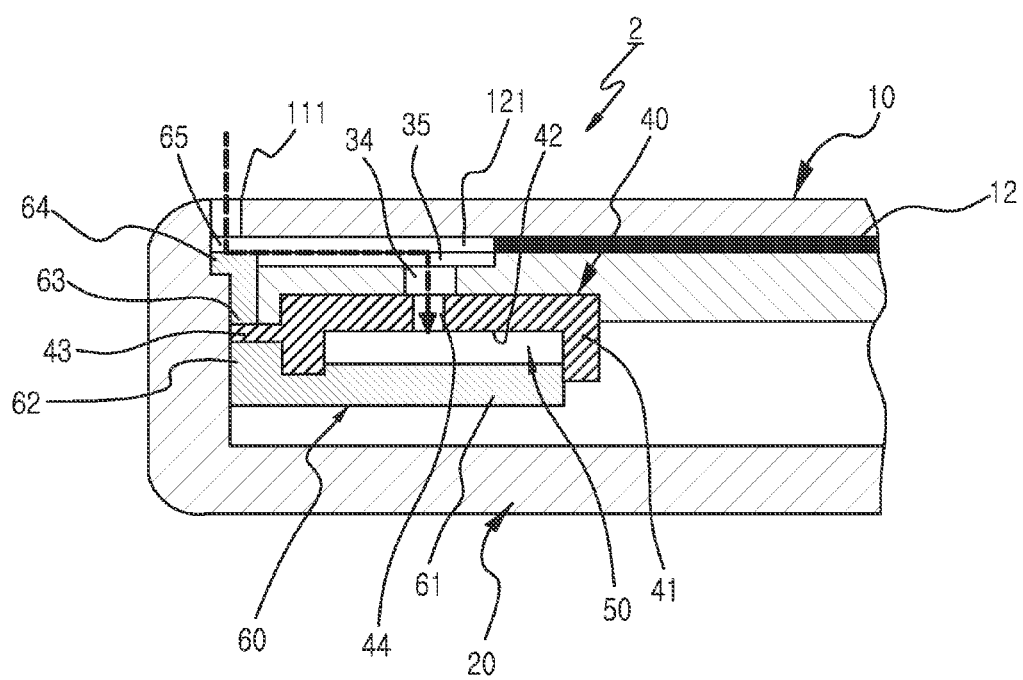
FIG. 4 is a partial cross section illustrating a coupling state of a microphone module installed in an electronic device according to an embodiment of the present disclosure.

FIG. 4 is a partial cross section illustrating a coupling state of a microphone module installed in an electronic device according to an embodiment of the present disclosure.

The coupling relationship of the microphone module 2 is described below.

Referring to FIG. 4, the fixing housing 40 for mounting the microphone 50 is installed in the installation groove 33 of the bracket 30. At this time, it is desirable that the microphone 50 is disposed in a position corresponding to the through-hole 34 of the bracket 30. Thereafter, the bracket 30 is coupled with the window 10. At this time, the double coated tape 12 attached to the window 10 and the bracket 30 can be firmly fixed in a surface contact manner.

If the fixing is completed, the wave guide groove 35 of the second surface 32 of the bracket 30 is coupled to the slit 121 of the double coated tape 12 and thus, the microphone hole 111 of the window 10, the slit 121 of the double coated tape 12, and the wave guide groove 35 of the bracket 30 become in a mutual communication state.

Accordingly, a voice from the external of the electronic device 1 is introduced into the microphone hole 111 of the window 10 and is incident to the microphone 50 along the through-hole 34 of the bracket 30 through the slit 121 and the wave guide groove 35.

A dotted-line arrow 65 of FIG. 4 denotes an incidence path 44 through which an external voice is introduced to the microphone 50.

Thereafter, the sealing member 60 is coupled to the top of the fixing housing 40. If the plate type body 61 of the sealing member 60 is installed in the member housing groove 42 of the fixing housing 40, and is fixed in such a manner that the protrusion 43 of the fixing housing 40 is inserted into the fixing groove 63 of the bending end 62 of the sealing member 60, the sealing part 64 formed at the end of the bending end 62 can seal to surround the microphone 111 at the inner surface 11 of the window 10. Thereafter, the case frame 20 is coupled with the window 10 to complete a product.

Figure 5:
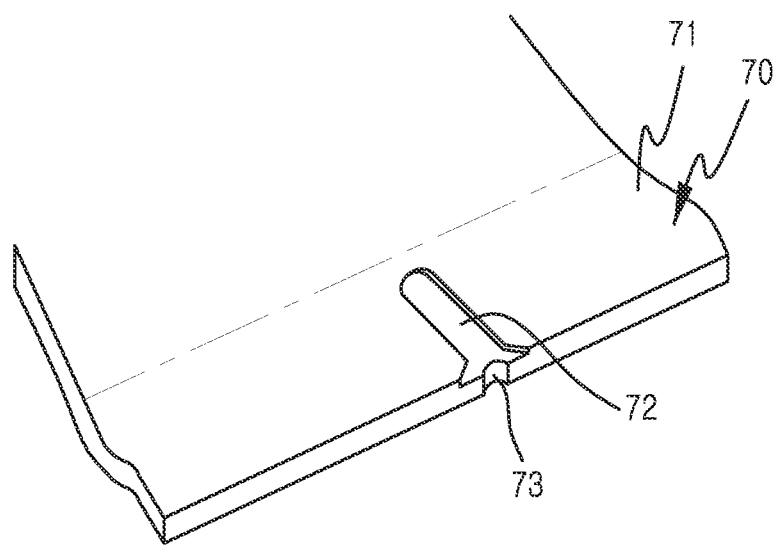
FIG. 5 is a rear perspective view illustrating a window according to an embodiment of the present disclosure.

FIG. 5 is a rear perspective view illustrating a window according to an embodiment of the present disclosure.

Referring to FIG. 5, a window 70 can be a concept including a touch panel. Because the window 70 is of a glass material, a slit 72 can be provided to form a voice incident path by using a double coated tape 12.

On the other hand, if the window 70 is of a transparent synthetic resin material, such as PolyEthylene Terephthalate (PET), the slit 72 and a microphone hole 73 can be provided more easily.

For example, as in FIG. 5, if the window 70 of a synthetic resin material is injected, the slit 72 provided in an inner surface 71 of the window 70 and the microphone hole 73 can be molded together with the window 70.

Figure 6:
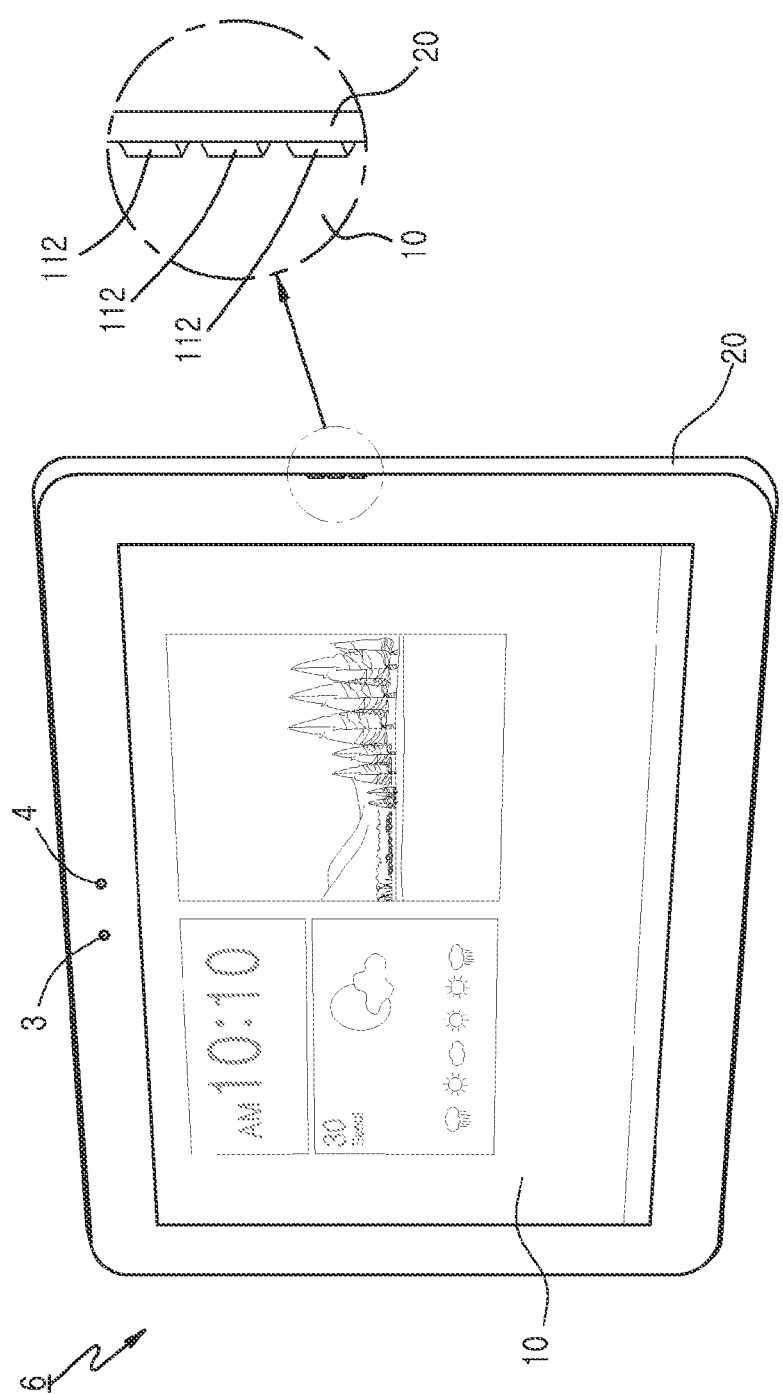
FIG. 6 is a perspective view of an electronic device illustrating a state of using a structure of a microphone hole as a speaker hole according to an embodiment of the present disclosure.

FIG. 6 is a perspective view of an electronic device 6 illustrating a state of using a structure of a microphone hole as a speaker hole according to an embodiment of the present disclosure.

Referring to FIG. 6, the microphone module 2 provides the microphone hole 111 as an incidence hole in the window edge of the boundary part between the window 10 and the case frame 20 and installs the microphone 50 and the sealing member 60 inside the microphone hole 111, providing a smooth voice incidence path.

However, the voice incidence path may be used as a voice emission path. For example, as illustrated in FIG. 6, a plurality of emission holes 112 are provided at a constant interval in a lateral surface along an edge of the window 10 among the boundary part between the window 10 of the electronic device 6 and the case frame 20 thereof. As in the above construction, a slit of the window 10, a wave guide groove of a bracket, and a through-hole of the bracket can be provided within the electronic device 6, and the speaker, not the microphone, can be installed in the installation groove of the bracket. Accordingly, a speaker sound from the speaker may ride the through-hole of the bracket and be emitted through the plurality of emission holes 112, which are provided in the front of the window 10 of the electronic device 6, via the wave guide groove and the slit.

There are many various schemes capable of deforming these embodiments within the spirit and scope of claims. In other words, there may be many other schemes capable of implementing the disclosure without departing from the spirit and scope of the appended claims.

For example, when the window is used as the display unit in the front of the electronic device, it is desirable that the microphone hole is provided in a boundary part with the case frame of a front upper part of the electronic device. In this case, this microphone module can be used as a main microphone module. However, this does not limit the spirit and scope of the disclosure. For instance, in a case of a portable terminal, such as a smart phone, a camera module and/or an LED module can be disposed in the rear of the portable terminal, and a microphone hole can also be provided in a window protecting these modules and installed in common parallel with a case frame in a scheme and structure. This microphone hole can be used as a noise-attenuating microphone module installed in the rear of the electronic device.

In addition, the electronic device has an effect of providing a microphone hole in a part of a window, thereby overcoming design limitations resulting from a separate microphone hole and, because the microphone hole is provided in a desired position of the front of a product, exhibiting the optimum performance for a voice recognition and a call.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A microphone apparatus for an electronic device, the microphone apparatus comprising:
   a window having at least one groove in a part of an edge of the window;
   a microphone installed in a position corresponding to the at least one groove of the window;
   a case frame coupled with the window and forming an appearance of the electronic device; and
   a bracket interposed between the window and the microphone, wherein the bracket comprises a first surface for installing the microphone, a second surface facing the first surface and getting in surface contact with an inner surface of the window, a through-hole passing from a position in which the microphone of the first surface is installed, to the second surface, and a wave guide groove provided to communicate from the through-hole to at least one microphone hole,
   wherein, when the at least one groove of the window is coupled with the case frame, the at least one microphone hole is disposed between the window and the case frame,
   wherein the microphone apparatus houses an external voice through the at least one microphone hole of the window, and
   wherein the inner surface of the window and the wave guide groove in the second surface of the bracket form a passage intersecting the at least one microphone hole and the through-hole.

2. The microphone apparatus of claim 1, further comprising a slit of a constant depth and a constant length provided in a position on the inner surface of the window corresponding to the wave guide groove.

3. The microphone apparatus of claim 2, wherein the slit is provided by a double coated tape attached to the inner surface of the window.

4. The microphone apparatus of claim 2, wherein, when the window is formed, the slit is molded together.

5. The microphone apparatus of claim 2, wherein the microphone is mounted and fixed to a fixing housing installed in an installation groove provided in the first surface of the bracket, and wherein a separate sealing member is further attached to a top of the fixing housing.

6. The microphone apparatus of claim 5, wherein the sealing member comprises:
   a plate type body installed to protect the microphone installed in the fixing housing;
   a bending end extending and bent at one side of the plate type body; and
   a sealing part formed at an end of the bending end configured to, when the window and the case frame of the electronic device are coupled with each other, separate a portion of the window at which the at least one microphone hole, the wave guide groove, and the slit meet from external exposure.

7. The microphone apparatus of claim 6, wherein the sealing member is fixed to the fixing housing in such a manner that a protrusion protruding from a lateral surface of the fixing housing is inserted into a fixing groove provided in the bending end of the sealing member.

8. The microphone apparatus of claim 5, wherein the sealing member comprises a rubber or a silicon material.

9. The microphone apparatus of claim 1, wherein the window comprises a transparent glass material or a transparent synthetic resin material.

10. The microphone apparatus of claim 1, wherein the window comprises a window for at least one of a display unit, a camera module and a Light Emitting Diode (LED) module.

11. The microphone apparatus of claim 1, wherein the at least one microphone hole comprises a curved or constantly-shaped groove provided to be dug inside in at least one part of the edge of the window.

12. An electronic device comprising:
   a window having at least one groove in a part of an edge of the window; and
   a microphone installed in a position corresponding to the at least one groove of the window;
   a case frame coupled with the window and forming an appearance of the electronic device; and a bracket interposed between the window and the microphone, wherein the bracket comprises a first surface for installing the microphone, a second surface facing the first surface and getting in surface contact with an inner surface of the window, a through-hole passing from a position in which the microphone of the first surface is installed, to the second surface, and a wave guide groove provided to communicate from the through-hole to at least one microphone hole, wherein, when the at least one groove of the window is coupled with the case frame, the at least one microphone hole is disposed between the window and the case frame, wherein the electronic device receives an external voice through the at least one microphone hole of the window, and wherein the inner surface of the window and the wave guide groove in the second surface of the bracket form a passage intersecting the at least one microphone hole and the through-hole.

13. The electronic device of claim 12, further comprising a slit of a constant depth and a constant length provided in a position on the inner surface of the window corresponding to the wave guide groove.

14. The electronic device of claim 13, wherein the microphone is mounted and fixed to a fixing housing installed in an installation groove provided in the first surface of the bracket, and a separate sealing member is further attached to a top of the fixing housing, wherein the sealing member comprises:
a plate type body installed to protect the microphone installed in the fixing housing;
a bending end extending and bent at one side of the plate type body; and
a sealing part formed at an end of the bending end configured to, when the window and the case frame of the electronic device are coupled with each other, separate a portion of the window at which the at least one microphone hole, the wave guide groove, and the slit meet from external exposure.

15. An electronic device comprising:
a window having at least one groove in a part of an edge of the window;
a speaker installed in a position corresponding to the at least one groove of the window;
a case frame coupled with the window and forming an appearance of the electronic device; and
a bracket interposed between the window and the speaker, wherein the bracket comprises a first surface for installing the speaker, a second surface facing the first surface and getting in surface contact with an inner surface of the window, a through-hole passing from a position in which the speaker of the first surface is installed, to the second surface, and a wave guide groove provided to communicate from the through-hole to at least one speaker hole, wherein, when the at least one groove of the window is coupled with the case frame, the at least one speaker hole is disposed between the window and the case frame, wherein the electronic device emits sound through the at least one speaker hole of the window, and wherein the inner surface of the window and the wave guide groove in the second surface of the bracket form a passage intersecting the at least one speaker hole and the through-hole.

16. The electronic device of claim 15, further comprising a slit of a constant depth and a constant length provided in a position on the inner surface of the window corresponding to the wave guide groove.

17. The electronic device of claim 16, wherein the speaker is mounted and fixed to a fixing housing installed in an installation groove provided in the first surface of the bracket, and a separate sealing member is further attached to a top of the fixing housing, wherein the sealing member comprises:
a plate type body installed to protect the speaker installed in the fixing housing;
a bending end extending and bent at one side of the plate type body; and
a sealing part formed at an end of the bending end configured to, when the window and the case frame of the electronic device are coupled with each other, separate a portion of the window where the at least one speaker hole, the wave guide groove, and the slit meet from external exposure.

* * * * *